United States Patent
Keene

(10) Patent No.: US 8,528,286 B2
(45) Date of Patent: Sep. 10, 2013

(54) SOUND CONTROL MAT

(75) Inventor: James R. Keene, Pepper Pike, OH (US)

(73) Assignee: Keene Building Products Co., Inc., Mayfield Heights, OH (US)

(*) Notice: Subject to any disclaimer, the term of this patent is extended or adjusted under 35 U.S.C. 154(b) by 516 days.

(21) Appl. No.: 12/615,420

(22) Filed: Nov. 10, 2009

(65) Prior Publication Data
US 2011/0107700 A1 May 12, 2011

(51) Int. Cl.
*E04F 15/22* (2006.01)

(52) U.S. Cl.
USPC .......................... 52/403.1; 52/145

(58) Field of Classification Search
USPC .............. 52/403.1, 145, 404.1, 506.04, 480
See application file for complete search history.

(56) References Cited

U.S. PATENT DOCUMENTS

| | | |
|---|---|---|
| 2,069,755 A | 2/1937 | Foster |
| 2,388,968 A | 11/1945 | Hedgren |
| 2,799,232 A | 7/1957 | Jaeger |
| 2,897,109 A | 7/1959 | Voigtman |
| 3,122,073 A | 2/1964 | Masse |
| 3,451,758 A | 6/1969 | McClain .................. 401/201 |
| 3,468,096 A | 9/1969 | Franz ........................ 53/450 |
| 3,500,618 A | 3/1970 | Sokol ........................ 55/484 |
| 3,501,878 A | 3/1970 | Segal |
| 3,596,425 A | 8/1971 | Kodaras ..................... 52/665 |
| 3,686,049 A | 8/1972 | Manner et al. |
| 3,687,759 A | 8/1972 | Werner et al. .............. 156/167 |
| 3,691,004 A | 9/1972 | Werner et al. .............. 161/150 |
| 3,837,988 A | 9/1974 | Hennen et al. |
| 3,847,524 A | 11/1974 | Mott .......................... 425/198 |
| 3,900,102 A | 8/1975 | Hurst |
| 4,010,748 A | 3/1977 | Dobritz |
| 4,012,249 A | 3/1977 | Stapp |
| 4,073,997 A | 2/1978 | Richards et al. |
| 4,094,380 A | 6/1978 | Kobayashi |
| 4,211,807 A | 7/1980 | Yazawa et al. .............. 428/109 |
| 4,212,692 A | 7/1980 | Rasen et al. ................. 156/167 |
| 4,315,392 A | 2/1982 | Sylvest |
| 4,546,024 A | 10/1985 | Brown |
| 4,617,219 A | 10/1986 | Schupack ..................... 428/113 |
| 4,681,786 A | 7/1987 | Brown |
| 4,685,259 A | 8/1987 | Eberhart et al. |
| 4,698,249 A | 10/1987 | Brown |
| 4,851,277 A | 7/1989 | Valkenburg et al. |
| 4,879,856 A | 11/1989 | Jones et al. |
| 4,942,699 A | 7/1990 | Spinelli ........................ 52/57 |
| 5,031,721 A | 7/1991 | Barden et al. |
| 5,052,157 A | 10/1991 | Ducroux et al. |
| 5,099,627 A | 3/1992 | Coulton et al. .............. 52/408 |
| 5,187,905 A | 2/1993 | Pourtau et al. |
| 5,205,091 A | 4/1993 | Brown |
| 5,224,315 A | 7/1993 | Winter |
| 5,230,189 A | 7/1993 | Sourlis |

(Continued)

OTHER PUBLICATIONS

Construction Canada; Sep. 2000 Issue; pp. 14-16; "Controlling the Transmission of Impact Sound Through Floors"; Sep. 2000.

(Continued)

*Primary Examiner* — Branon Painter
(74) *Attorney, Agent, or Firm* — Renner, Otto, Boisselle & Sklar, LLP

(57) ABSTRACT

A sound control mat, comprising: a resilient layer of extruded polymer monofilaments, and a fiberglass scrim adhered to the resilient layer. A floor assembly employing the foregoing sound control mat is disclosed.

18 Claims, 3 Drawing Sheets

(56) References Cited

U.S. PATENT DOCUMENTS

| | | |
|---|---|---|
| 5,230,192 A | 7/1993 | Webb et al. |
| 5,259,157 A | 11/1993 | Ault |
| 5,343,661 A | 9/1994 | Sourlis |
| 5,369,926 A | 12/1994 | Borland |
| 5,383,314 A | 1/1995 | Rothberg |
| 5,489,462 A | 2/1996 | Sieber |
| 5,572,842 A | 11/1996 | Stief et al. |
| 5,584,950 A | 12/1996 | Gaffigan |
| 5,589,242 A | 12/1996 | Stief et al. |
| 5,598,673 A | 2/1997 | Atkins |
| 5,619,832 A | 4/1997 | Myrvold |
| 5,641,950 A | 6/1997 | Kotter |
| 5,652,001 A | 7/1997 | Perry et al. ............ 425/382.2 |
| 5,669,192 A | 9/1997 | Opdyke et al. ................ 52/211 |
| 5,673,521 A | 10/1997 | Coulton et al. ............... 52/199 |
| 5,730,548 A | 3/1998 | Brero et al. |
| 5,756,942 A | 5/1998 | Tanaka et al. |
| 5,867,957 A | 2/1999 | Holtrop |
| 5,902,432 A | 5/1999 | Coulton et al. ............... 156/199 |
| 5,907,932 A | 6/1999 | LeConte et al. |
| 5,937,594 A | 8/1999 | Sourlis |
| 5,960,595 A | 10/1999 | McCorsley, III et al. ....... 52/199 |
| 5,984,044 A | 11/1999 | Christensen |
| 6,023,892 A | 2/2000 | Sourlis |
| RE36,676 E | 5/2000 | Sourlis |
| 6,067,781 A | 5/2000 | Ford et al. ................... 54/66 |
| 6,112,476 A | 9/2000 | Schulenburg |
| 6,131,353 A | 10/2000 | Egan |
| 6,167,668 B1 | 1/2001 | Fine et al. ................... 52/403.1 |
| 6,171,984 B1 | 1/2001 | Paulson et al. ............... 442/331 |
| 6,253,872 B1 | 7/2001 | Neumann |
| 6,256,955 B1 | 7/2001 | Lolly et al. |
| 6,277,024 B1 | 8/2001 | Coulton ................... 454/365 |
| 6,298,613 B1 | 10/2001 | Coulton ................... 52/199 |
| 6,308,472 B1 | 10/2001 | Coulton ................... 52/198 |
| 6,355,333 B1 | 3/2002 | Waggoner et al. ............ 428/174 |
| 6,594,965 B2 | 7/2003 | Coulton ................... 52/302.1 |
| 6,662,504 B2 | 12/2003 | Krogstad |
| 6,676,199 B2 | 1/2004 | Buisson et al. |
| 6,759,135 B2 * | 7/2004 | Bramlett et al. ............... 428/489 |
| 6,786,013 B2 | 9/2004 | Coulton ................... 52/198 |
| 6,804,922 B1 | 10/2004 | Egan ................... 52/408 |
| 6,817,442 B2 | 11/2004 | Van Sleet et al. |
| 6,883,284 B1 | 4/2005 | Burgunder et al. ........... 52/302.1 |
| 6,920,723 B2 | 7/2005 | Downey ................... 52/144 |
| 6,981,916 B2 | 1/2006 | Coulton ................... 454/365 |
| 6,983,822 B2 | 1/2006 | O'Regan et al. |
| 6,990,775 B2 * | 1/2006 | Koester ................... 52/302.1 |
| 7,093,395 B2 | 8/2006 | Hinault et al. |
| 7,096,630 B1 | 8/2006 | Keene et al. ................. 52/309.8 |
| 7,182,688 B2 | 2/2007 | Coulton ................... 454/365 |
| 7,384,331 B2 | 6/2008 | Coulton ................... 454/365 |
| 7,393,273 B2 | 7/2008 | Ehrman et al. ................ 454/365 |
| 7,422,520 B2 | 9/2008 | Coulton et al. ............... 454/365 |
| 7,765,761 B2 * | 8/2010 | Paradis ................... 52/474 |
| 2002/0025751 A1 * | 2/2002 | Chen et al. ................... 442/324 |
| 2002/0170648 A1 | 11/2002 | Dinkel ................... 156/44 |
| 2003/0033779 A1 | 2/2003 | Downey |
| 2003/0114055 A1 * | 6/2003 | Burton et al. ................... 442/31 |
| 2003/0207640 A1 | 11/2003 | Anderson et al. |
| 2004/0129493 A1 | 7/2004 | Campbell |
| 2004/0182037 A1 | 9/2004 | Sourlis ................... 52/606 |
| 2005/0009428 A1 | 1/2005 | Porter et al. ................... 442/129 |
| 2005/0103568 A1 | 5/2005 | Sapoval et al. |
| 2005/0144901 A1 | 7/2005 | Egan et al. ................. 52/782.1 |
| 2005/0178613 A1 | 8/2005 | Humphries et al. |
| 2005/0194205 A1 | 9/2005 | Guo |
| 2005/0284059 A1 | 12/2005 | Rerup |
| 2005/0284690 A1 | 12/2005 | Proscia et al. |
| 2006/0117687 A1 | 6/2006 | Ehrman et al. ................. 52/302.1 |
| 2006/0144012 A1 | 7/2006 | Manning et al. |
| 2006/0230699 A1 | 10/2006 | Keene |
| 2007/0000198 A1 | 1/2007 | Payne et al. |
| 2007/0051069 A1 | 3/2007 | Grimes ................... 52/782.1 |
| 2007/0234650 A1 | 10/2007 | Coulton et al. ................. 52/95 |
| 2007/0261365 A1 | 11/2007 | Keene ................... 52/796.1 |
| 2007/0289238 A1 | 12/2007 | Payne et al. |
| 2008/0041005 A1 | 2/2008 | Ehrman et al. ................. 52/408 |
| 2008/0148669 A1 | 6/2008 | Ehrman et al. ................. 52/514 |
| 2008/0220714 A1 | 9/2008 | Caruso et al. ................. 454/365 |
| 2008/0289292 A1 | 11/2008 | Giles et al. ................. 52/783.11 |
| 2009/0025316 A1 | 1/2009 | Coulton et al. ................. 52/199 |
| 2009/0038249 A1 | 2/2009 | Coulton et al. ................. 52/409 |
| 2009/0241453 A1 | 10/2009 | Dellinger et al. ................. 52/408 |
| 2009/0242325 A1 | 10/2009 | Dellinger et al. ................. 181/290 |
| 2010/0229486 A1 | 9/2010 | Keene |

OTHER PUBLICATIONS

Dow Chemical Company, Midland, MI 48674; five pages of information on "Styrofoam Weathermate Plus"; believed to be published 2003.

Colbond, Inc., Enka, NC 28728; four pages of information on Enka-Engineered "Enkasonic Sound Control Matting"; Jul. 2001.

Liner Rolpanit Incorporated North America, Toronto M6G3H1, four pages, entitled "Introducing a Unique Solution to Pitch Roof Vapor Control"; believed to be published 2003.

Keene Building Products, Website, Jan. 8, 2009, pp. 1-16, Quiet Qurl® noise control products.

* cited by examiner

SOUND CONTROL MAT

TECHNICAL FIELD

This invention relates to sound control mats. The sound control mats are useful for noise control with flooring systems.

BACKGROUND

Three-dimensional products are used with floor systems for reducing impact noise.

SUMMARY

This invention relates to a sound control mat, comprising: a resilient layer of extruded polymer monofilaments, the polymer monofilaments being heat welded at junctions to form a matrix of tangled monofilaments, the resilient layer having a machine direction, a cross-direction, a first side and a second side, the resilient layer comprising a plurality of waves forming a repeating pattern of peaks and valleys, the waves extending in the machine direction and the cross-direction, the average ratio of the width of the waves, as measured in the cross-direction, to the length of the waves, as measured in the machine direction, being at least about 2:1; and a fiberglass scrim overlying the second side of the resilient layer, the scrim comprising a plurality of fiberglass strands, the resilient layer being heat welded to the fiberglass scrim.

This invention also relates to a floor assembly, comprising: a sub-flooring layer; a top-flooring layer overlying the sub-flooring layer; and the above-indicated sound control mat positioned between the sub-flooring layer and the top-flooring layer, the resilient layer contacting the sub-flooring layer, the scrim contacting the top-flooring layer.

BRIEF DESCRIPTION OF THE DRAWINGS

In the annexed drawings like parts and features have like references. A number of the drawings are schematic illustrations which may not necessarily be drawn to scale.

DETAILED DESCRIPTION

Figure 1:
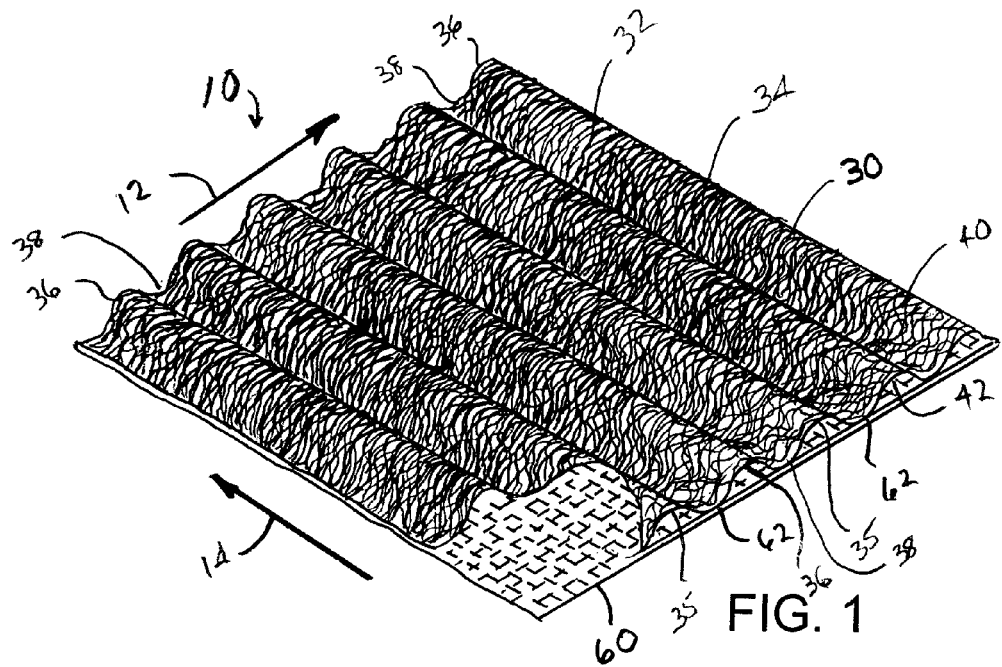
FIG. 1 is a schematic illustration of a sound control mat within the scope of the invention, the sound control mat comprising a resilient layer and a fiberglass scrim, part of the resilient layer being cut away to show the scrim.
Figure 2:
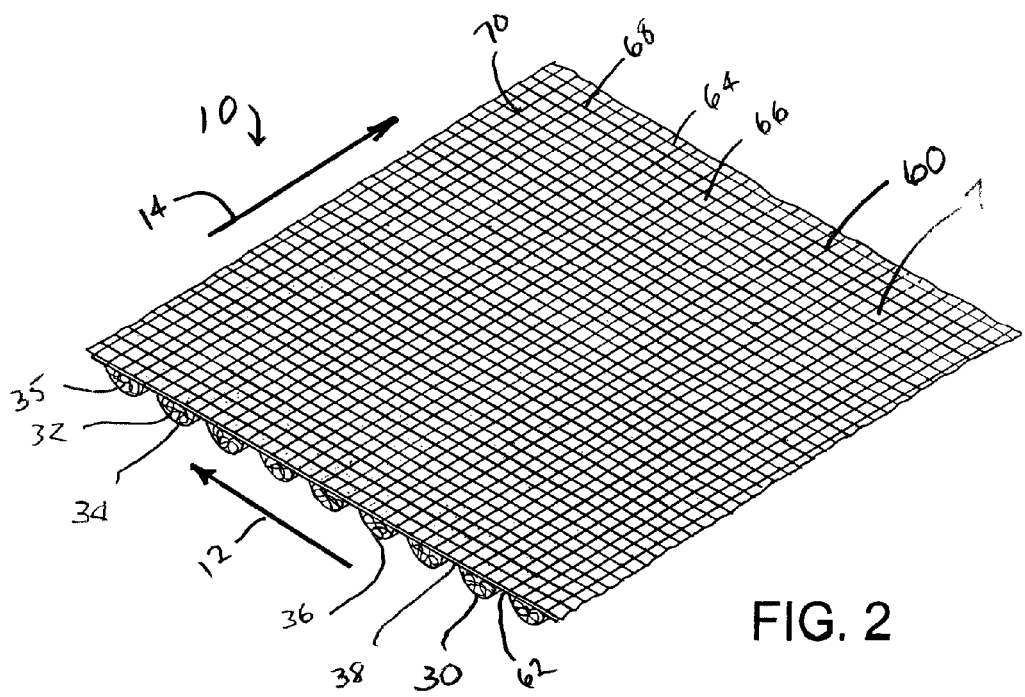
FIG. 2 is a schematic illustration of the sound control mat illustrated in FIG. 1 with the mat turned over and rotated 90°, the scrim being shown in greater detail.
Figure 3:
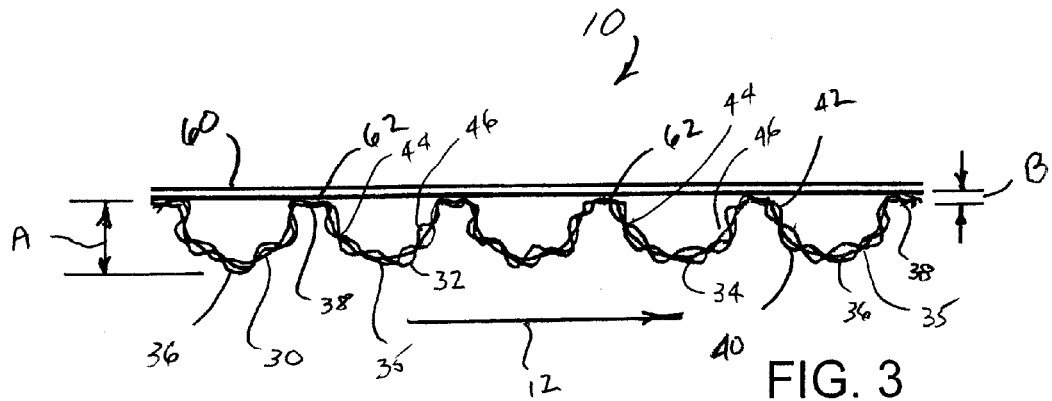
FIG. 3 is a side elevation of the sound control mat illustrated in FIG. 2, this side view showing the resilient layer with a repeating pattern of peaks and valleys extending in the machine direction.

All numerical ranges disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The term "machine direction" refers to the direction of the flow of polymer from an extruder when forming the inventive sound control mat.

The term "cross-direction" refers to the direction that is oriented 90° from the machine direction.

The expression, "a plurality of waves forming a repeating pattern of peaks and valleys" is used herein to refer to the shape of the resilient layer of the inventive sound control mat. The waves, as viewed from a side edge of the mat, may have a sinuous configuration or a serpentine configuration. The waves, in their illustrated embodiment, are shown in FIGS. 1-5. In the illustrated embodiment, the waves have irregularities as a result of the fact that the resilient layer is made from a plurality of extruded polymer monofilaments that are entangled, and some of the waves may have edges and/or dimensions that are slightly different than other waves in the resilient layer. The average ratio of the width of the waves, as measured in the cross-direction, to the length of the waves, as measured in the machine direction, is at least about 2:1, and may be at least about 10:1.

The term "scrim" is used herein to refer to a thin layer of fiberglass strands. The layer of fiberglass strands may be a woven layer.

The term "resilient layer" refers to the fact that when the inventive sound control mat is installed in the above-identified inventive floor assembly, the resilient layer may give or attenuate in response to impacting forces contacting the top flooring layer. This give or attenuation is believed to be due, at least in part, to the construction of the resilient layer with its plurality of waves in the form of a repeating pattern of peaks and valleys. This give or attenuation has the effect of creating a sound break or "spring" between the flooring layers. This may result in the sub-flooring layer receiving less of an impact from vibration which in turn may lower the level of sound heard by occupants in rooms above and/or below the inventive floor assembly.

Referring to FIGS. 1-5, the inventive sound control mat, in its illustrated embodiment, comprises sound control mat 10 which includes resilient layer 30 and fiberglass scrim 60. The mat 10 has a machine direction, which is indicated by the arrow 12, and a cross-direction, which is indicated by the arrow 14. The machine direction 12 is the direction in which polymer monofilaments 32 used to make the resilient layer 30 flow out of an extruder and onto a substrate during the formation of the mat 10. The cross-direction 14 is the direction that is oriented 90° from the machine direction 12.

The resilient layer 30 is formed from a plurality of the extruded polymer monofilaments 32. The monofilaments 32 are welded at junctions to form a matrix 34 of the polymer monofilaments 32. The resilient layer 30 has a first side 40 and a second side 42. The resilient layer 30 comprises a plurality of waves 35 which provide a repeating pattern of peaks 36 and valleys 38. Each wave 35 has a pair of legs 44 and 46 extending from the peaks 36 to the valleys 38. The legs 44 and 46 are heat welded to the fiberglass scrim 60 at points of contact 62. The average distance in the machine direction 12 from one point of contact 62 to the next point of contact 62 may be in the range from about 0.25 to about 3 inches, and in one embodiment in the range from about 0.5 to about 0.75 inches. The average ratio of the width of each wave 35, as measured in the cross-direction 14, to the length of each wave 35, as measured in the machine direction 12, from one point of contact 62 to the next point of contact 62, may be at least about 2:1, and in one embodiment at least about 10:1, and in one embodiment in the range from about 16:1 to about 100:1, and in one embodiment in the range from about 16:1 to about 25:1, and in one embodiment in the range from about 50:1 to about 100:1.

The resilient layer 30 may have a thickness with a major dimension A in the range from about 0.1 to about 1 inch, and in one embodiment from about 0.2 to about 0.8 inch. The resilient layer 30 may have a thickness with a minor dimension B in the range from about 0.01 to about 0.04 inch, and in one embodiment in the range from about 0.02 to about 0.03 inch. The resilient layer 30 may have from about 25 to about 400 polymer monofilaments 32 per foot as measured along the cross-direction 14 of the mat 10, and in one embodiment from about 75 to about 150 polymer monofilaments 32 per foot. The polymer monofilaments 32 may have an average diameter in the range from about 1 to about 4 mils, and in one embodiment from about 2 to about 3 mils.

The resilient layer 30 may be made from any thermoplastic polymer that provides the desired properties of strength and resilience when used in the inventive floor assembly. The resilient layer 30 may be made of a polyolefin, polyamide, polyester, polyvinylchloride (PVC), or a mixture of two or more thereof. The polyolefin may comprise polyethylene, polypropylene, or a mixture thereof. The polyamide may be a Nylon.

The fiberglass scrim 60 overlies the second side 42 of the resilient layer 30. The resilient layer 30 is heat welded to the fiberglass scrim 60 at the points of contact 62. The fiberglass scrim 60 may comprise a fiberglass layer 64 and a polymer coating 66. The fiberglass layer 64 may be a woven layer. The fiberglass layer 64 has a plurality of fiberglass strands 68 extending parallel to one another in the machine direction 12, and a plurality of fiberglass strands 70 extending parallel to one another in the cross-direction 14. The fiberglass strands 66 and 70 intersect one another at angles of about 90°. The strands 68 and 70 may be referred to as yarns. The strands 68 and 70 may be aligned in a side-by-side configuration or in an over/under configuration. The polymer coating 66 provides a binding to hold the strands 68 and 70 together in the scrim 60.

The fiberglass strands 68 and 70 may each comprise a plurality of fiberglass filaments. The fiberglass filaments may be combined with filaments of another material, for example, a polymer such as polyester. The average diameter of the fiberglass strands 68 and 70 may be in the range from about 10 to about 200 mils, and in one embodiment in the range from about 20 to about 40 mils. The number of fiberglass strands 68 extending in the machine direction 12 may be in the range from about 1 to about 20 strands per inch of scrim 60 as measured in the cross-direction 14, and in one embodiment in the range from about 6 to about 10 strands per inch, and in one embodiment about 7 or 8 strands per inch. The number of fiberglass strands 70 extending in the cross-direction 14 may be in the range from about 1 to about 20 strands per inch of scrim 60 as measured in the machine direction 12, and in one embodiment in the range from about 6 to about 10 strands per inch of scrim as measured in the machine direction 12, and in one embodiment about 7 or about 8 strands per inch.

The polymer coating 66 may comprise any coating that is sufficient to bind the strands 68 and 70 and provide the scrim 60 with the dimensional stability, strength and flexibility characteristics required for use in the sound control mat 10. The polymer coating 66 may provide a polymer layer 71 extending between the strands 68 and 70. The polymer layer 71 may be sufficient to make the fiberglass scrim 60 water or moisture impermeable. The strands 68 and 70 may be embedded in the polymer layer 71. The polymer layer 71 may overlie one or both sides of the strands 68 and 70. The polymer coating may be made of a polyolefin, polyvinyl alcohol, polyvinylchloride (PVC), polyacrylate, styrene-butadiene rubber, or a mixture of two or more thereof. The polyolefin may comprise polyethylene, polypropylene, or a mixture thereof. The polymer coating may be formed using a plastisol, such as a PVC plastisol. The term "plastisol" is used herein to refer to a suspension of polymer particles in a plasticizer.

The scrim 60 may have a thickness in the range from about 5 to about 20 mils, and in one embodiment from about 10 to about 15 mils.

An example of a scrim that may be used is available from Saint-Gobain Technical Fabrics under Product Number GD8811/V38/V38. This scrim is made of fiberglass yarn. The pattern is 8×7.5 yarns per inch. The tensile strength is 64×60 pounds per inch. The weight of this scrim is 3.45 ounces per square yard. The polymer coating used to form the scrim is a PVC plastisol (a suspension of polyvinyl chloride particles in a plasticizer).

The sound control mat 10 may have a weight in the range from about 1 to about 5 ounces per square foot, and in one embodiment in the range from about 2 to about 4 ounces per square foot, and in one embodiment in the range from about 1.5 to about 2.5 ounces per square foot. The mat 10 may have a porosity in the range from about 75 to about 98%, and in one embodiment in the range from about 90 to about 95%. The mat 10 may have any length and width that is suitable for the desired end use. The length, as measured in the machine direction 12, may be, for example, from about 25 to about 200 feet, and in one embodiment from about 50 to about 100 feet. The width, as measured in the cross-direction 14, may be, for example, in the range from about 3 to about 8 feet, and in one embodiment from about 3.5 to about 4.5 feet.

Figure 5:
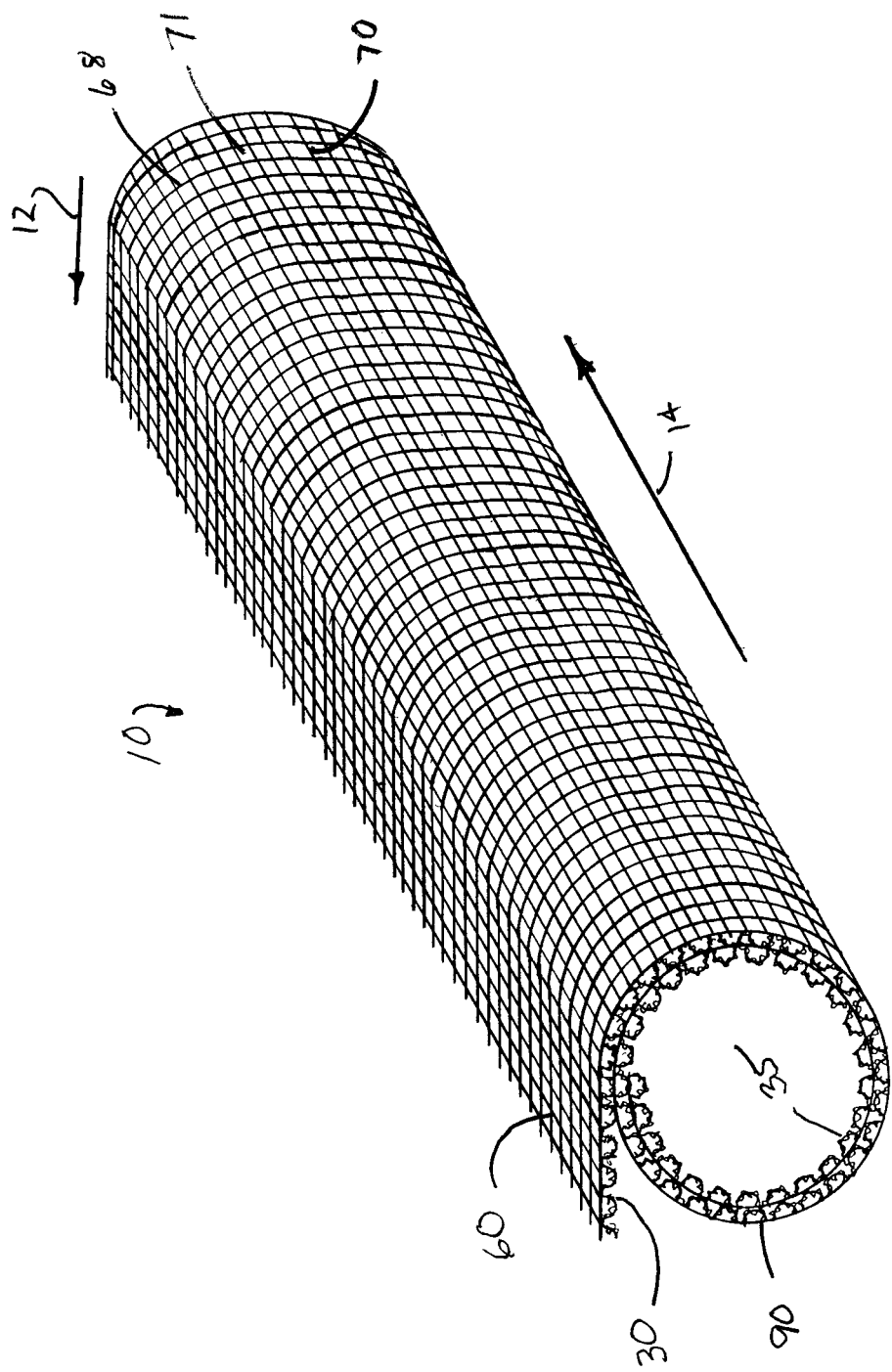
FIG. 5 is a schematic illustration of the sound control mat illustrated in FIGS. 1-4 wherein the sound control mat is shown in the form of a roll.

The sound control mat 10 may be supplied in the form of roll 90 to facilitate transport of the mat 10 and installation of the mat at the job site. The roll 90 is illustrated in FIG. 5. When forming the roll 90, the mat 10 may be rolled in the machine direction 12. The scrim 60 may be on the outside as illustrated in FIG. 5 when the mat 10 is rolled, or alternatively, the scrim 60 may be on the inside. The diameter of the roll 90 may be of any dimension suitable for providing the desired length of mat 10. For example, the roll 90 may have a diameter in the range from about 10 to about 36 inches, and in one embodiment in the range from about 20 to about 25 inches.

The process for making the sound control mat 10 may include the steps of extruding the polymer monofilaments 32 onto a substrate to form the resilient layer 30. The substrate may have a surface with a repeating pattern of peaks and valleys extending in the machine direction that is complimentary to or a "negative" shape corresponding to the repeating pattern of peaks and valleys formed in the resilient layer 30. The polymer monofilaments 32 may become entangled and heat welded to form a matrix 34 of tangled monofilaments. The fiberglass scrim 60 may then be placed in contact with the resilient layer 30 while the resilient layer 30 is in a sufficiently tacky state to allow the resilient layer 30 to be heat welded to the fiberglass scrim 60 at points of contact 62.

Figure 4:
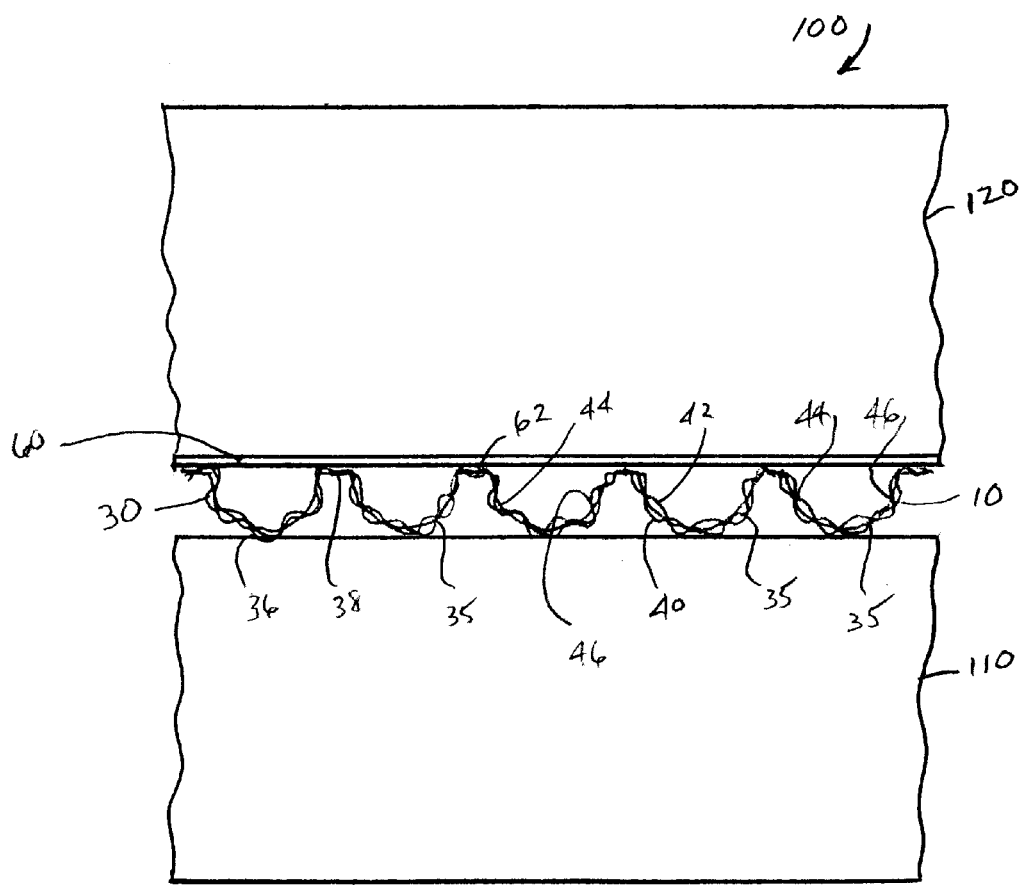
FIG. 4 is a side elevational view of a flooring system within the scope of the invention, the flooring system comprising a sub-flooring layer, a top flooring layer overlying the sub-flooring layer, and the sound control mat illustrated in FIGS. 1-3 and 5 positioned between the sub-flooring layer and the top flooring layer, the resilient layer of the sound control mat contacting the sub-flooring layer, and the scrim of the sound control mat contacting the top-flooring layer.

The sound control mat 10 may be used in forming the inventive floor assembly which, in its illustrated embodiment, is shown in FIG. 4. Referring to FIG. 4, the inventive floor assembly comprises floor assembly 100 which includes sub-flooring layer 110, top flooring layer 120 overlying the sub-flooring layer 110, and sound control mat 10 positioned between the sub-flooring layer 110 and the top flooring layer 120. The resilient layer 30 is in contact with the sub-flooring layer 110. The scrim 60 is in contact with the top flooring layer 120. The sub-flooring layer 110 may be made of any conventional sub-flooring material, for example, concrete, steel, wood, and the like. The top flooring layer 120 can also be made of any conventional top-flooring material including, for example, wood, gypsum concrete, and the like. The top flooring layer 120 may optionally have a finish flooring layer overlying the top flooring layer. The finish flooring layer, not shown in the drawings, may be made of any finish flooring layer material, for example, wood, linoleum, ceramic tile, and the like.

The resilient layer 30 may be of sufficient strength to support a top-flooring layer 120 with a weight in the range up to about 25 pounds per square foot, and in one embodiment in the range from about 5 to about 25 pounds per square foot, and in one embodiment in the range from about 8 to about 15 pounds per square foot.

An advantage of the inventive floor assembly 100 is that the sound control mat 10 gives or attenuates in response to impacting forces contacting the top flooring layer 120. This provides the effect of creating a sound break or spring between the flooring layers 120 and 110. This may result in the sub-flooring layer 110 receiving less of an impact from vibration which in turn may lower the level of sound heard by occupants in rooms above and/or below the floor assembly 100.

When the top flooring layer 120 comprises a poured floor, such as a gypsum concrete floor, the scrim 60 may become partially or completely embedded in the flooring layer 120, and this embedding may enhance the flexural strength of the flooring layer 120.

While not wishing to be bound by theory, it is believed that the mat 10 exhibits enhanced strength and resiliency, as well as enhanced sound attenuation properties, due to the shape of the resilient layer 30 with its plurality of waves forming a repeating pattern of peaks and valleys, and the construction of the fiberglass scrim 60. When installed in the floor assembly 100, resilient layer 30 gives or attenuates in response to impacting forces contacting the top flooring layer 120. This has the effect of creating a sound break or spring between the flooring layers 110 and 120. The sub-flooring layer 110 receives a reduced level of vibrational impact which in turn lowers the level of sound heard by occupants above or below the floor assembly 100. This give or attenuation is believed to be due, at least in part, to the shape of the waves 35 in the resilient layer 30. The peaked sections of waves 35 may at least partially give or depress in response to impacting forces contacting the top flooring layer 120 and then spring back once the impacting forces have ceased. This give or attenuation puts an outward stress on the legs 44 and 46 of the waves 35, which in turn transmits stress to the fiberglass scrim 60. The shape of the waves 35 with their extended width to length ratios of at least about 2:1 enhance the strength and stability of the resilient layer 30. The fiberglass scrim 60 provides the mat 10 with strength, stability and reinforcement. Because of the construction of the scrim 60 with multiple strands 68 and 70, the scrim 60 may give or stretch in response to the stress applied to it from the legs 44 and 46 of the waves 35 of the resilient layer 30. In this way the scrim 60 may mimic the movements of the resilient layer 30 when the mat 10 is subjected to vibrational impact.

While the invention has been explained in relation to various embodiments, it is to be understood that various modifications thereof will become apparent to those skilled in the art upon reading this specification. Therefore, it is to be understood that the invention provided herein is intended to cover such modifications as may fall within the scope of the appended claims.

The invention claimed is:

1. A floor assembly, comprising:
a sub-flooring layer;
a top-flooring layer overlying the sub-flooring layer; and
a sound control mat positioned between the sub-flooring layer and the top-flooring layer, the sound control mat comprising:
a resilient layer of extruded polymer monofilaments, the polymer monofilaments being heat welded at junctions to form a matrix of tangled monofilaments, the resilient layer having a machine direction and a cross-direction, the resilient layer comprising a plurality of waves forming a repeating pattern of peaks and valleys, the waves extending in the machine direction and the cross-direction, each wave having a pair of legs, each leg extending from the peak of the wave to an adjacent valley, the average ratio of the width of the waves, as measured in the cross-direction, to the length of the waves, as measured in the machine direction, being at least about 2:1; and
a fiberglass scrim bonded to the resilient layer at the valleys of the waves, the scrim comprising a plurality of fiberglass strands, the fiberglass strands comprising two sets of strands, the strands in one set of strands intersecting the strands in the other set of strands at angles of about 90°, the fiberglass scrim further comprising a water or moisture impermeable polymer coating extending between the two sets of strands;
the resilient layer contacting the sub-flooring layer at the peak of the waves, the scrim contacting the top-flooring layer,
wherein the peaks of the waves are configured to at least partially compress upon application of an impacting force to the top-flooring layer and recover their pre-compressed shape upon release of the impacting force.

2. The floor assembly of claim 1 wherein the polymer monofilaments have an average diameter in the range from about 1 to about 4 mils.

3. The floor assembly of claim 1 wherein the thickness of the resilient layer has a major dimension in the range from about 0.1 to about 1 inch, and a minor dimension in the range from about 0.01 to about 0.04 inch.

4. The floor assembly of claim 1 wherein the mat has a porosity level in the range from about 75 to about 98 percent.

5. The floor assembly of claim 1 wherein the resilient layer comprises from about 25 to about 400 polymer monofilaments per foot as measured in the cross direction.

6. The floor assembly of claim 1 wherein the polymer monofilaments are made of a material comprising polyolefin, polyamide, polyester, polyvinylchloride, or a mixture of two or more thereof.

7. The floor assembly of claim 1 wherein the polymer monofilaments are made of a material comprising polyethylene, polypropylene, or a mixture thereof.

8. The floor assembly of claim 1 wherein the strands in one set of strands are aligned parallel to each other and extend lengthwise in the machine direction, and the strands in the other set of strands are aligned parallel to each other and extend in the cross-direction.

9. The floor assembly of claim 8 wherein the number of strands extending in the machine direction is in the range from about 1 to about 20 per inch of scrim as measured in the cross-direction; and the number of strands extending in the cross-direction is in the range from about 1 to about 20 per inch of scrim as measured in the machine direction.

10. The floor assembly of claim 1 wherein the fiberglass strands comprise a plurality of filaments.

11. The floor assembly of claim 1 wherein the fiberglass strands are made of a plurality of filaments, the filaments comprising fiberglass filaments and optionally polyester filaments.

12. The floor assembly of claim 1 wherein the polymer coating comprises a polyolefin, polyvinyl alcohol, polyvinyl chloride, polyacrylate, styrene-butadiene rubber, or a mixture of two or more thereof.

13. The floor assembly of claim 1 wherein the fiberglass scrim comprises a polymer coating for binding the fiberglass strands, the polymer coating being derived from a polyvinyl chloride plastisol.

14. The floor assembly of claim 1 wherein the scrim has a thickness in the range from about 0.5 to about 1.5 mils.

15. The floor assembly of claim 1 wherein the mat has a weight in the range from about 1 to about 5 ounces per square foot.

16. The floor assembly of claim 1 wherein the mat is in the form of a roll.

17. The floor assembly of claim 1 wherein the average ratio of the width of each wave, as measured in the cross-direction, to the length of each wave, as measured in the machine direction, is at least about 10:1.

18. The floor assembly of claim 1 wherein the top-flooring layer comprises a poured floor, and at least part of the scrim is embedded in the top-flooring layer.

* * * * *